United States Patent
Aizer et al.

(10) Patent No.: US 9,734,028 B2
(45) Date of Patent: Aug. 15, 2017

(54) REVERSE RESYNCHRONIZATION BY A SECONDARY DATA SOURCE WHEN A DATA DESTINATION HAS MORE RECENT DATA

(71) Applicant: INTERNATIONAL BUSINESS MACHINES CORPORATION, Armonk, NY (US)

(72) Inventors: Daniel M. Aizer, Petah-Tiqwa (IL); Yuval Ben-Horin, Petah Tikva (IL); Michael Keller, Haifa (IL); Osnat Shasha, Holon (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 67 days.

(21) Appl. No.: 14/754,324

(22) Filed: Jun. 29, 2015

(65) Prior Publication Data

US 2016/0378625 A1    Dec. 29, 2016

(51) Int. Cl.
*G06F 11/00* (2006.01)
*G06F 11/20* (2006.01)
*G06F 3/06* (2006.01)

(52) U.S. Cl.
CPC .......... *G06F 11/2069* (2013.01); *G06F 3/065* (2013.01); *G06F 3/067* (2013.01);
(Continued)

(58) Field of Classification Search
CPC .......................... G06F 11/2058; G06F 11/2069
(Continued)

(56) References Cited

U.S. PATENT DOCUMENTS 5,155,845 A * 10/1992 Beal .................... G06F 11/2058
714/6.12
6,842,834 B2    1/2005 Crockett et al.
(Continued)

OTHER PUBLICATIONS

Yang et al., Trap-Array: A Disk Array Architecture Providing Timely Recovery to Any Point-in-time, 12 pages, ACM SIGARCH Computer Architecture News. vol. 34. No. 2. IEEE Computer Society, 2006.

(Continued)

*Primary Examiner* — Dieu-Minh Le
(74) *Attorney, Agent, or Firm* — Griffiths & Seaton PLLC (57) ABSTRACT

Methods, computing systems and computer program products implement embodiments of the present invention that include configuring a first storage system to mirror first storage regions to corresponding second storage regions in a second storage system via a first data connection, and to mirror the first storage regions to corresponding third storage regions in a third storage system via a second data connection. Upon the second storage system receiving, subsequent to detecting a failure of the first storage system, a host I/O request to retrieve data from a given second storage region and determining that the respective timestamp of the corresponding third storage region on the third storage system is more recent than the respective timestamp of the given second storage region on the second storage system, the second storage system retrieves, via a third data connection, the data from the corresponding third storage region on the third storage system.

18 Claims, 3 Drawing Sheets

(52) U.S. Cl.
CPC ........ *G06F 3/0619* (2013.01); *G06F 11/2058* (2013.01); *G06F 2201/805* (2013.01)

(58) Field of Classification Search
USPC ................. 714/6.23, 6.2, 6.21, 6.12, 6.13
See application file for complete search history.

(56) References Cited

U.S. PATENT DOCUMENTS

| | | | |
|---|---|---|---|
| 7,096,379 B2 * | 8/2006 | Viswanathan | G06F 11/2064 707/999.202 |
| 7,278,049 B2 | 10/2007 | Bartfai et al. | |
| 7,607,037 B1 * | 10/2009 | LeCrone | G06F 11/2094 714/6.23 |
| 7,979,396 B1 * | 7/2011 | Krishnamurthy | G06F 17/30575 707/655 |
| 8,127,174 B1 * | 2/2012 | Shah | G06F 11/1438 714/13 |
| 8,209,282 B2 | 6/2012 | Kern et al. | |
| 8,788,772 B2 | 7/2014 | Clayton et al. | |
| 8,793,456 B2 | 7/2014 | Blea et al. | |
| 2007/0294314 A1 | 12/2007 | Padovano et al. | |
| 2015/0363269 A1 * | 12/2015 | Baker | G06F 11/10 714/766 |

OTHER PUBLICATIONS

Nanda et al., VDRS: An inexpensive approach to server disaster recovery, 12 pages, Document downloaded on Dec. 19, 2014 from: http://www.ecsl.cs.sunysb.edu/tr/vdrs.pdfStony Brook, NY.

* cited by examiner

REVERSE RESYNCHRONIZATION BY A SECONDARY DATA SOURCE WHEN A DATA DESTINATION HAS MORE RECENT DATA

FIELD OF THE INVENTION

The present invention relates generally to computer storage systems, and specifically to perform a reverse resynchronization in a computing facility comprising multiple storage systems.

BACKGROUND

In data storage, storage device mirroring replicates data stored on a primary storage system to a secondary storage system, in order to ensure redundancy. For a storage facility comprising primary and secondary storage systems, mirroring can be implemented either synchronously or asynchronously. During synchronous mirroring, a host communicating with the primary storage system receives a write acknowledgement after data is successfully written to both of the primary and the secondary storage systems. During asynchronous mirroring, the host receives the write acknowledgement after the data is written to the primary storage system, and the data is written to the secondary storage system at a later time.

The description above is presented as a general overview of related art in this field and should not be construed as an admission that any of the information it contains constitutes prior art against the present patent application.

SUMMARY

There is provided, in accordance with an embodiment of the present invention a method, including configuring a first storage system to perform a first mirroring operation including mirroring first storage regions to corresponding second storage regions in a second storage system via a first data connection, and to perform a second mirroring operation including mirroring the first storage regions to corresponding third storage regions in a third storage system via a second data connection, detecting a failure in the first storage system, receiving, by the second storage system subsequent to detecting the failure, a request from a host computer to retrieve data from a given second storage region, determining that the respective timestamp of the corresponding third storage region on the third storage system is more recent than the respective timestamp of the given second storage region on the second storage system, and retrieving, by the second storage system via a third data connection, the data from the corresponding third storage region on the third storage system, in response to the received request.

There is also provided, in accordance with an embodiment of the present invention an computing facility, including a first storage system including one or more first storage devices, each of the first storage devices including multiple first storage regions, a second storage system including one or more second storage devices, each of the second storage devices including multiple second storage regions, a third storage system including one or more third storage devices, each of the third storage devices including multiple third storage regions, a first data connection coupling the first storage system to the second storage system, and a second data connection coupling the first storage system to the third storage system, and a third data connection coupling the second storage system to the third storage system, wherein the first storage system is configured to perform a first mirroring operation by mirroring the first storage regions to corresponding second storage regions via the first data connection, and to perform a second mirroring operation by mirroring the first storage regions to corresponding third storage regions in the third storage system via the second data connection, and wherein the second storage system is configured to detect a failure in the first storage system, to receive, subsequent to detecting the failure, a request from a host computer to retrieve data from a given second storage region, to determine that the respective timestamp of the corresponding third storage region on the third storage system is more recent than the respective timestamp of the given second storage region on the second storage system, and to retrieve, via the third data connection, the data from the corresponding third storage region on the third storage system, in response to the received request.

There is further provided, in accordance with an embodiment of the present invention a computer program product, the computer program product including a non-transitory computer readable storage medium having computer readable program code embodied therewith, the computer readable program code including computer readable program code configured to arrange a first storage system to perform a first mirroring operation including mirroring first storage regions to corresponding second storage regions in a second storage system via a first data connection, and to perform a second mirroring operation including mirroring the first storage regions to corresponding third storage regions in a third storage system via a second data connection, computer readable program code configured to detect a failure in the first storage system, computer readable program code configured to receive, by the second storage system subsequent to detecting the failure, a request from a host computer to retrieve data from a given second storage region, computer readable program code configured to determine that the respective timestamp of the corresponding third storage region on the third storage system is more recent than the respective timestamp of the given second storage region on the second storage system, and computer readable program code configured to retrieve, by the second storage system via a third data connection, the data from the corresponding third storage region on the third storage system, in response to the received request.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Enterprise storage systems can implement high availability and disaster recovery solutions by performing three-way data replication (also referred to as three-way mirroring). Three-way data replication comprises storing three copies of the data on three separate storage systems that may be in different physical sites. In the event of a failure of a given storage system, three-way data replication enables continued data replication between the remaining storage systems, and is therefore used extensively in enterprise storage systems.

For example, an enterprise storage system implementation of three-way data replication may comprise a local computing facility comprising a first and a second storage system, and a remote computing facility comprising a third storage system. In a typical configuration, the first storage system is configured as a source for synchronous and asynchronous mirroring operations, the second storage system is configured as a destination for the synchronous mirroring operations, and the third storage system is configured as a destination for the asynchronous mirroring operations. Additionally, the second storage system is configured as a standby source for standby asynchronous mirroring operations (i.e., in the event of a failure of the first storage system), and the third storage system is configured as a standby destination for the standby asynchronous mirroring operations. Therefore, in this typical configuration:

The first storage system synchronously mirrors data to the second storage system, and asynchronously mirrors data to the third storage system.

The first storage system can be configured as a primary storage system with respect to host input/output (I/O traffic), and the second and the third storage systems can be configured as secondary storage systems.

The first and the second storage systems communicate via a first data connection (typically broadband), and the second and the third storage systems communicate via a second data connection (typically narrowband). Additionally, there is be a third (i.e., a standby) data connection that couples the second storage system with the third storage system. The third data connection is typically a narrowband connection. In an event of a failure in the first storage system, the second system can be reconfigured as the primary storage system (i.e., to service I/O requests) and to asynchronously mirror data to the third storage system via the third data connection.

In some deployments, the first and the second storage systems may be collocated at a local/primary site, and the third storage system may be located at a remote/secondary site that does not have the required computing and/or network resources to function as the production/primary site in the event of failures of both the first and the secondary storage systems. Such deployments may be needed, for example, to fulfill certain regulatory requirements for keeping the third copy of the data.

In the event of a failure of a first data connection coupling the first and the second storage systems, the synchronous data replication from the first storage system to the second storage system is halted. However, the asynchronous data replication from the first storage system the third storage system can still continue via a second data connection coupling the first and the third storage systems. Since the asynchronous mirroring is still active from the first to the third storage system, data stored on the third storage system will typically be more recent than data stored on the second storage system.

The failure of the first data connection may be followed by a failure of the first storage system, and as a result of the failure of the first storage system, the second storage system is reconfigured as the primary storage system in order to process I/O requests from one or more host computers, and to asynchronously mirror data to the third storage system (i.e., a "standby" mirroring operation). In some embodiments, the second storage system is configured as the primary storage system since the third storage system is not powerful enough to process host I/O requests and/or the third data connection does not have enough network bandwidth to process the host I/O requests (i.e., in embodiments where the third data connection comprises a narrowband data link, the third data connection can be subject to high latency if handling host I/O requests).

Upon detecting the failure of the first storage system, the second storage system checks if data stored remotely on the third storage system is more recent than data stored locally on the second storage system. If the data on the third storage system is more recent and the third storage system is not able to be reconfigured as the primary storage system (e.g., there is insufficient network bandwidth between the host computers and the third storage system comprises a computer such as a pool server that is not powerful enough to be a primary production system), then a system administrator can choose one of the following courses of action:

Failover to the second storage system as a new primary storage system and disregard any data stored on the third storage system, thereby restoring the primary storage system's state back to the time of the failure. Since the third storage system may have been updated with data that was not mirrored to the second storage system, this course of action is rarely acceptable.

Suspend all host I/O requests on the second storage system until the more recent data on the third storage system has been replicated back to the second storage system. While this course of action can resynchronize the state of the second storage system to the state of the first storage system at the time of the failure, a delay of minutes (or maybe even hours if the third data connection comprises a narrowband data connection and/or the third storage system is not powerful enough) during the resynchronization is rarely acceptable.

Embodiments of the present invention provide methods and systems for processing I/O requests while resynchronizing the state of the third storage system to the state of the second storage system at the time of the failure of the first storage system or the first data connection. Resynchronizing the state of the third storage system to the state of the second storage system at the time of the failure of the first storage system or the first data connection is referred to herein as a reverse resynchronization process.

In embodiments described herein, the first storage system comprises one or more first storage devices having multiple first storage regions, the second storage system comprises one or more second storage devices having multiple second storage regions, and the third storage system comprises one or more third storage devices having multiple third storage regions. The first storage regions have a one-to-one correspondence with the second storage regions, and have a one-to-one correspondence with the third storage regions. A given storage region (also known as a block or a partition) is a sequence of bytes having a specific length, typically one megabyte.

As described hereinbelow, the first storage system can be configured to mirror the first storage regions to corresponding second storage regions in the second storage system via the first data connection, and to mirror the first storage regions to corresponding third storage regions in the third storage system via the second data connection. Initially, the first storage system can be configured as the primary storage system, and the second and the third storage systems can be configured as secondary storage systems. While embodiments herein describe each of the storage regions (i.e., the first, the second and the third storage regions) having a respective timestamp indicating a time that the respective storage region was most recently updated, any other method of identifying the last update time for each of the storage regions is considered to be within the spirit and scope of the present invention.

Upon detecting a failure of the first storage system subsequent to a failure of the first data connection, the second storage system can be reconfigured as the primary storage system, and a reverse resynchronization process can be started to resynchronize the second storage system with the third storage system by conveying all the more recent data to the second storage system via the third data connection. During the reverse resynchronization process, any data that is stored in a given second storage region that is older (e.g., has an older timestamp) than data stored in the corresponding third storage region is replaced with the data from the corresponding third storage region. As described supra, while embodiments herein describe using a timestamp to identify a last update time for a given storage region, any other method of identifying the last update time for each of the storage regions is considered to be within the spirit and scope of the present invention.

The reverse resynchronization process is typically activated in the background, thereby enabling the second storage system to process host I/O requests (i.e. I/O request from one or more host computers) without any interruption. In other words, the second storage system can receive and process host I/O requests while performing the reverse resynchronization in the background.

Therefore, while performing the reverse resynchronization process (i.e., subsequent to detecting the failure of the first storage system), if the second storage system (that is now configured as the primary storage system) receives a host I/O request to retrieve data from a given second storage region, and the respective timestamp of the corresponding third storage region on the third storage system is more recent than the respective timestamp of the given second storage region on the second storage system, then the data can be retrieved from the corresponding third storage region on the third storage system in response to the request. However, if the respective timestamp of the corresponding third storage region on the third storage system is not more recent than the respective timestamp of the given second storage region on the second storage system, then the data can be retrieved from the given second storage region on the second storage system in response to the request.

Figure 1:
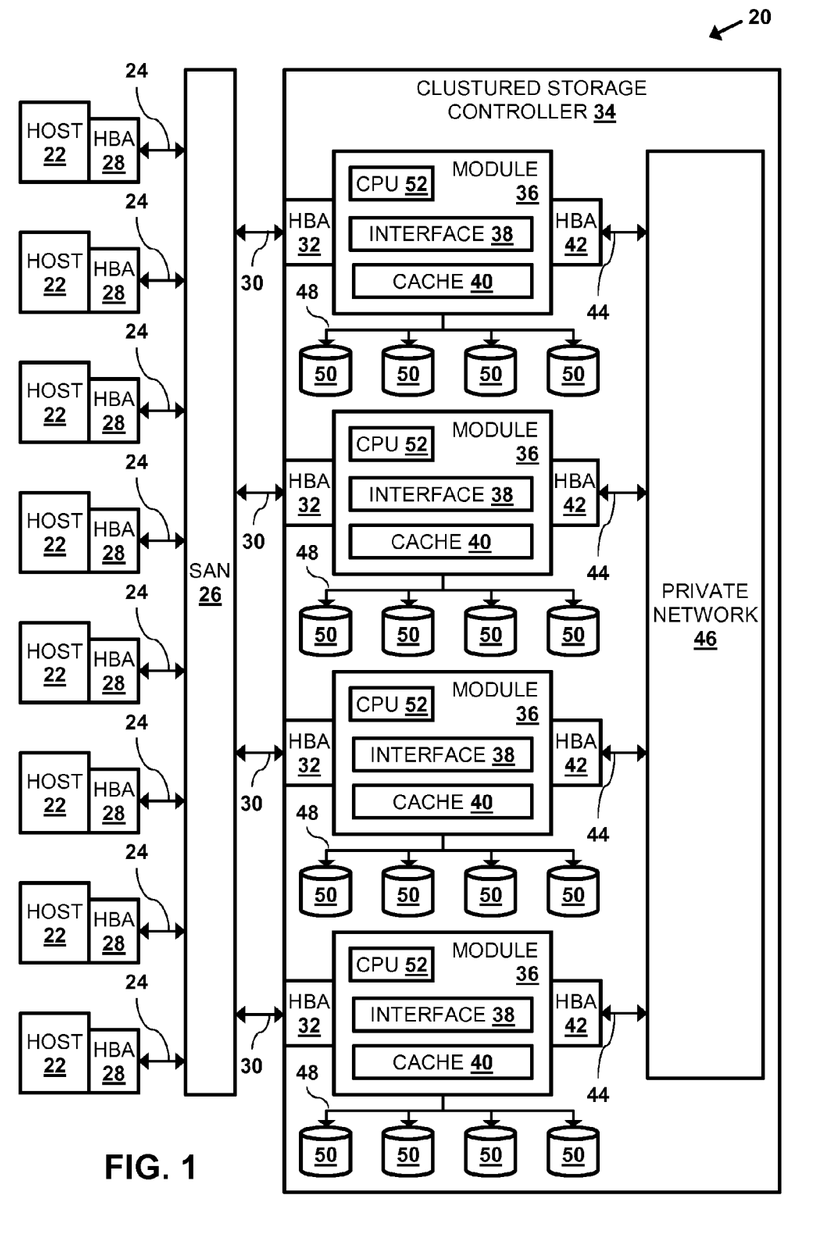
FIG. 1 is a block diagram that schematically illustrates a storage system comprising a storage controller, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes a processor 52, an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other elements of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

While the configuration in FIG. 1 shows storage controller 34 comprising four modules 36 and each of the modules coupled to four storage devices 50, a given storage controller 34 comprising any multiple of modules 36 coupled to any plurality of storage devices 50 is considered to be with the spirit and scope of the present invention.

Figure 2:
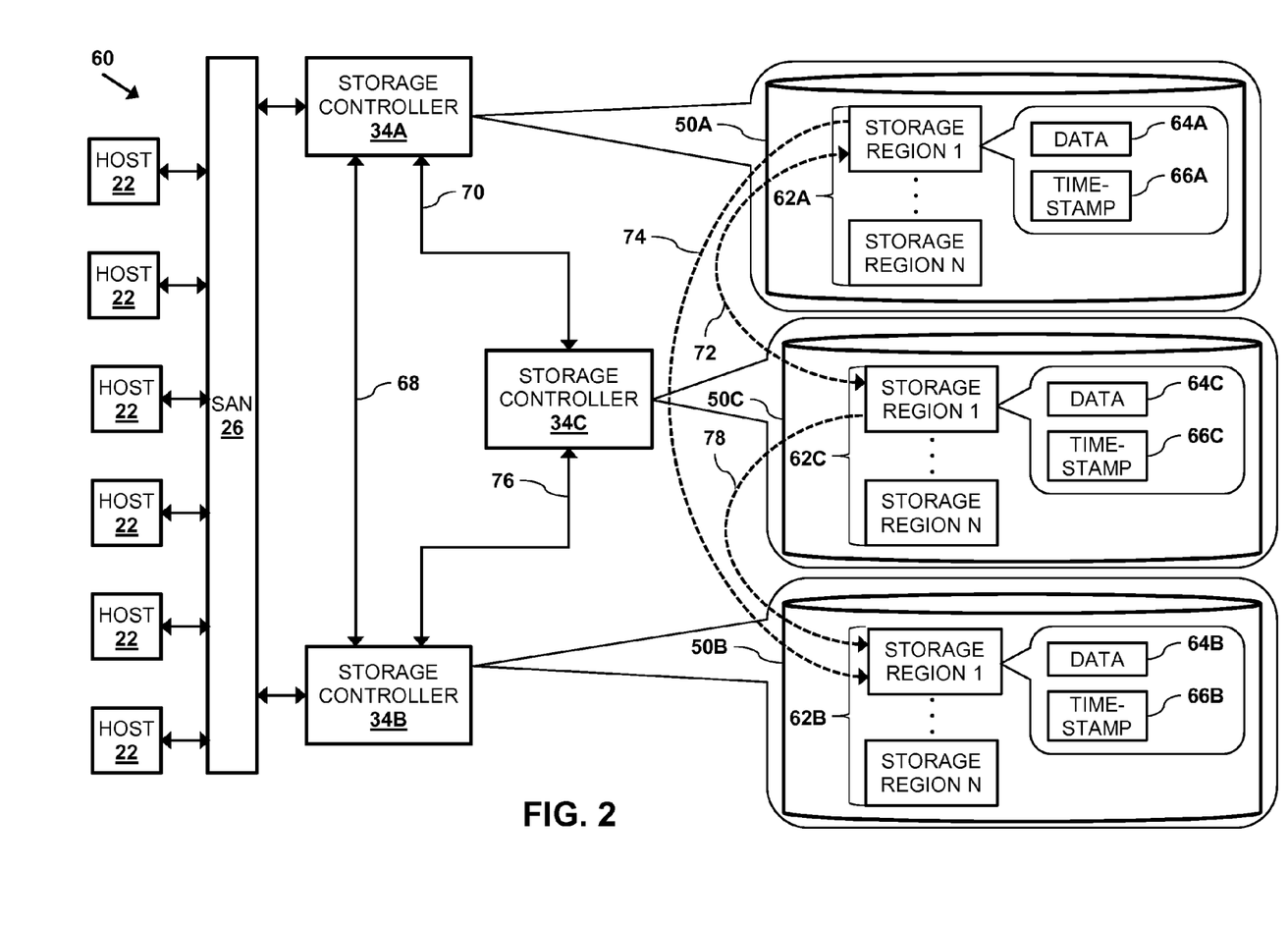
FIG. 2 is a block diagram that schematically illustrates a computing facility comprising a first storage controller configured as a primary storage system and two additional storage controller configured as secondary storage systems, in accordance with an embodiment of the present invention.

FIG. 2 is a block diagram that schematically illustrates a computing facility 60 comprising a first given storage controller 34 initially configured as a primary server and two additional storage controllers 34 initially configured as secondary servers, in accordance with an embodiment of the present invention. In the configuration shown in FIG. 2, storage controllers 34 (also referred to herein as storage systems) and their respective elements can be differentiated by appending a letter to the identifying numeral, so that the storage controllers comprise storage controllers 34A, 34B and 34C.

Each storage device 50 comprises multiple storage regions 62. As described supra, a given storage region (also known as a block or a partition) 62 is a sequence of bytes having a specific length, typically one megabyte. Each given storage region 62 comprises data 64 and a timestamp 66 that indicates a time that the data in the given storage region was most recently updated.

In operation, processor 52 may manage one or more logical volumes (not shown), and can allocate each of the storage regions to a given logical volume. When configured as a primary storage system, storage controller 34A synchronously mirrors storage regions 62A to storage regions 62B via a data connection 68, and asynchronously mirrors storage regions 62A to storage regions 62C via a data connection 70. Synchronously mirroring storage regions 62A to storage regions 62B is indicated by a bidirectional arrow 72, and asynchronously mirroring regions 62A to regions 62C is indicated by a unidirectional arrow 74.

As described hereinbelow, storage controller 34B can be reconfigured as the primary storage system in the event of a failure of data connection 68 or storage controller 34A. When configured as the primary storage system, storage controller 34B asynchronously mirrors storage regions 62B to storage regions 62C via data connection 76. As described hereinbelow, data connection 76 comprises a standby data connection that computing facility 20 can use upon a failure of storage controller 34A. Asynchronously mirroring regions 62B to regions 62C is indicated by a unidirectional arrow 78.

In a typical deployment, storage controllers 34A and 34B are collocated at a primary (i.e., a local) site, and storage controller 34C is located at a secondary (i.e., a remote) site. In this typical deployment data connection 68 may comprise a high-speed local area network (LAN) connection, and data connections 70 and 76 may comprise a slower speed wide area network (WAN) connection.

In embodiments described herein, each storage region 62A has a corresponding storage region 62B and a corresponding storage region 62C. In other words, storage regions 62A have a one-to-one correspondence with storage regions 62B, and have a one-to-one correspondence with storage regions 62C. Additionally, storage controller 34A may also be referred to as a first storage system, storage regions 62A may also be referred to as first storage regions, data connection 68 may also be referred to as a first data connection, storage controller 34B may also be referred to as a second storage system, storage regions 62B may also be referred to as second storage regions, data connection 70 may also be referred to as a second data connection, storage controller 34C may also be referred to as a third storage system, storage regions 62C may also be referred to as third storage regions, and data connection 68 may also be referred to as a third data connection.

Each processor 52 comprises a general-purpose central processing unit (CPU) or special-purpose embedded processors (e.g., the power controller may comprise a complex programmable logic device or a baseboard management controller) which are programmed in software or firmware to carry out the functions described herein. The software may be downloaded to modules 36 in electronic form, over a network, for example, or it may be provided on non-transitory tangible media, such as optical, magnetic or electronic memory media. Alternatively, some or all of the functions of the processor may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Host I/O Processing During Reverse Resynchronization

Figure 3:
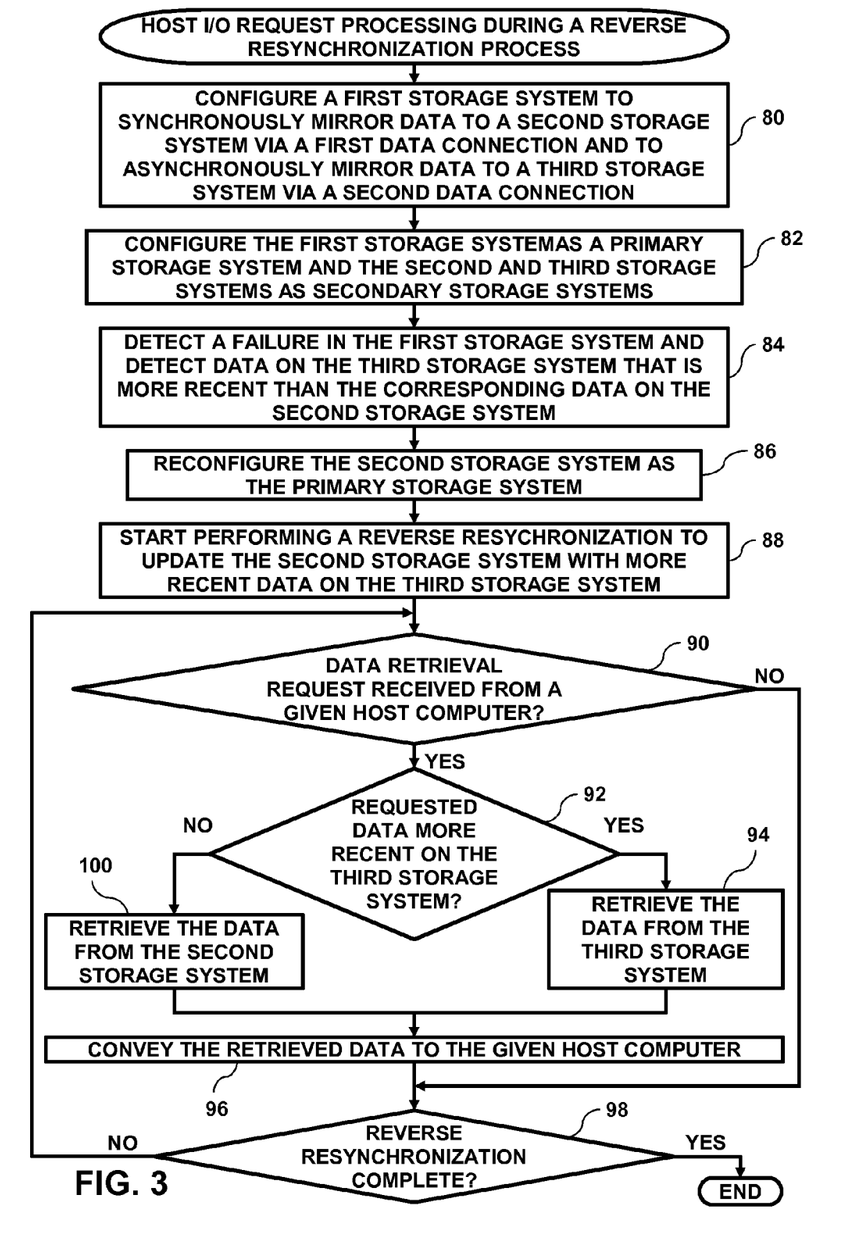
FIG. 3 is a flow diagram that schematically illustrates a method of processing host I/O requests during a reverse resynchronization process, in accordance with an embodiment of the preset invention.

FIG. 3 is a flow diagram that schematically illustrates a method of storage controller 34B processing I/O requests from host computers 22 while performing, in the background, a reverse resynchronization process with storage controller 34C, in accordance with an embodiment of the preset invention. In embodiments of the present invention, the reverse resynchronization process comprises updating storage controller 34B with data 64C in one or more storage regions 62C that have more recent timestamps than the data in the corresponding one or more storage regions 62B.

In a first configuration step 80, a system administrator (not shown) configures storage controller 34A to perform a first mirroring operation by mirroring data 64A in storage regions 62A to data 64B in storage regions 62B in storage controller 34B, and to perform a second mirroring operation by mirroring data 64A in storage regions 62A to data 64C in storage regions 62C in storage controller 34C. While the configuration in FIG. 2, shows storage regions 62A synchronously mirrored to storage regions 62B via data connection 68 and asynchronously mirrored to storage regions 62C via data connection 70, each of the first and the second mirroring operation may comprise either a synchronous mirroring operation or an asynchronous mirroring operation.

In a second configuration step 82, the system administrator configures storage controller 34A as a primary storage system, and configures storage controllers 34B and 34C as secondary storage systems. In a detection step 84, processor 52B detects a failure in storage controller 34A and detects data 64C that that was updated more recently than the corresponding data 64B, and in response to detecting the failure and the data discrepancy, processor 52B (or the system administrator) reconfigures storage controller 34B as the primary storage system in a third configuration step 86, and starts performing a reverse resynchronization process reverse resynchronization step 88.

The data discrepancy indicates that data connection 68 failed prior to the failure of storage controller 34A. Since data connection 68 failed, storage controller 36A was not able to mirror storage regions 62A to storage regions 62B, but was still able to mirror storage regions 62A to storage regions 62C. Therefore, there may be data 64C that is more "current" than the corresponding data 64B, and the reverse resynchronization process comprises processor 52B (or 52C) identifying any storage regions 62C whose respective timestamp 66C is more recent than the respective timestamp 66B of the corresponding second storage 62B, and copying data 64C from each given identified third storage region to data 64B in the corresponding second storage region 62B.

In a first comparison step 90, while performing the reverse resynchronization process (i.e., subsequent to detecting the failure of storage controller 34A), if processor 52B receives, from a given host computer 22, a request to retrieve data 64B from a given storage region 62B, then in a second comparison step 92, processor 52B checks if the respective timestamp 66C of the corresponding storage region 62C is more recent than the respective timestamp 66B of the given storage region 62B. In other words, processor 52B checks to see if data 64C in the corresponding storage region 62C is more recent than data 64B in the given storage region 62B.

In some embodiments, computing facility 60 can use snapshots (not shown) for disaster recovery planning. A snapshot may be a copy of the data residing on a given storage region 62 that is created at a particular point in time. Since a full backup of a large data set can take a long time to complete, a snapshot may define the dataset to be backed up. The data associated with the snapshot is static, and is therefore protected from any subsequent changes to the data on the storage region (e.g., a database update).

If storage controllers 34A-34C use snapshots for disaster recovery planning, then while storage controller 34B is reconfigured as the primary storage controller during the reverse resynchronization process, computing facility 60 may perform the following steps to determine if data 64C in the corresponding storage region 62C is more recent than data 64B in the given storage region 62B:

Processor 52B detects that there is data 64B having a more recent timestamp 66B than the corresponding data 64C.

Processor 52B instructs storage controller 34C to generate a bitmap (not shown) indicating which storage regions 62C have changed from the moment of the failure of data connection until the most recent consistent point in time on storage controller 34C.

Storage controller 34C can generate the bitmap by comparing two snapshots. For example, storage controller 34C starts generating the bitmap by comparing a snapshot since the last asynchronous replication with a snapshot that was taken when data connection 68 failed.

When storage controller 34C completes generating the bitmap, processor 52C conveys the generated bitmap to storage controller 34B.

Processor 52B instructs storage controller 34C to start the reverse resynchronization process.

Processor 52C conveys any "diff" data to storage controller 34B.

Upon updating a given storage region 62C with corresponding data 66C, processor 52B updates the bitmap received from storage controller 34C to reflect the update (i.e., the corresponding bit in the bitmap is cleared).

Returning to the flow diagram, if the corresponding data 64C is more recent than data 64B in the given storage region 62B, then processor 52B retrieves, via data connection 76, data 66C from the corresponding storage region 62C in a first retrieval step 94, and conveys the retrieved data to the given host computer in a response step 96. To retrieve data 66C, processor 52B can redirect the received request to storage controller 34C by conveying, to storage controller 34C, an additional request to retrieve data 64C from the corresponding storage region 62C. Upon receiving the redirected request, processor 52C retrieve the data 64C from the corresponding storage region 62C, and conveys the retrieved data to storage controller 34B.

In a third comparison step 98, if the reverse resynchronization process started in step 88 is complete, then the method ends. However, if the reverse resynchronization process is not complete, then the method continues with step 90. In the configuration shown in FIG. 2, upon completing the reverse resynchronization process, storage controller 34B starts mirroring (either synchronously or asynchronously) data 64B in storage regions 62B to data 64C in storage regions 62C in storage controller 34C via data connection 76.

Returning to step 92, If the corresponding data 64C is not more recent than data 64B in the given storage region 62B, then processor 52B retrieves data 64B from the given storage region 62B in a second retrieval step 100, and the method continues with step 96. Returning to step 90, if processor 52B does not receive a data retrieval request, then the method continues with step 98.

In some embodiments, upon detecting the failure in data connection 68, processor 52A can perform the following steps:

Stops the synchronous mirroring to storage controller 34B

Convey a message to storage controller 34C to start tracking any changes to storage regions 62C from the moment that data connection 68 failed. For example, upon detecting the failure in data connection 68, processor 52B may instruct storage controller 34C to generate a snapshot (not shown). During the reverse resynchronization process (started in step 86) storage controller 34C compares this snapshot with a most recent replicated snapshot that storage controller 34B received before the failure. The delta between the two snapshots reflects any changes from the moment of the failure until the last asynchronous replication. In some embodiments, processor 52A may instruct storage controller 34C to tag each storage region 62C which was modified since the last asynchronous replication process.

Upon detecting that data connection 68 is functional, processor 52A can convey a message to storage controller 34C to stop tracking changes to storage regions 62C. Typically storage controller 34A starts resynchronizing with storage controller 34B and instructs storage controller 34C to stop tracking the changes only after storage controllers 34A and 34B are fully re-synchronized.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
configuring a first storage system to perform a first mirroring operation comprising mirroring first storage regions to corresponding second storage regions in a second storage system via a first data connection, and to perform a second mirroring operation comprising mirroring the first storage regions to corresponding third storage regions in a third storage system via a second data connection;
detecting a failure in the first storage system;
receiving, by the second storage system subsequent to detecting the failure, a request from a host computer to retrieve data from a given second storage region;
determining that a respective timestamp of the corresponding third storage region on the third storage system is more recent than the respective timestamp of the given second storage region on the second storage system;
retrieving, by the second storage system via a third data connection, the data from the corresponding third storage region on the third storage system, in response to the received request; and
upon detecting the failure in the first data connection, performing a reverse resynchronization process comprising identifying any of the third storage regions whose respective timestamp that is more recent than the respective timestamp of the corresponding second storage region, and copying each given identified third storage region to the corresponding second storage region.

2. The method according to claim 1, wherein each of the mirroring operations is selected from a group consisting of a synchronous mirroring operation and an asynchronous mirroring operation.

3. The method according to claim 1, wherein the second storage system receives the request while performing the reverse resynchronization process.

4. The method according to claim 1, and comprising upon completing the reverse resynchronization process, mirroring the second storage regions to the corresponding third storage regions in the third storage system via the third data connection.

5. The method according to claim 1, wherein retrieving the data from the corresponding third storage region comprising redirecting, by the second storage system, the request to the third storage system.

6. The method according to claim 1, and comprising prior to detecting the failure of the first storage system, halting the mirroring of the first storage regions to the second storage regions upon a failure of the first data connection.

7. A computing facility, comprising:
a first storage system comprising one or more first storage devices, each of the first storage devices comprising multiple first storage regions;
a second storage system comprising one or more second storage devices, each of the second storage devices comprising multiple second storage regions;
a third storage system comprising one or more third storage devices, each of the third storage devices comprising multiple third storage regions;
a first data connection coupling the first storage system to the second storage system; and
a second data connection coupling the first storage system to the third storage system; and
a third data connection coupling the second storage system to the third storage system, wherein the first storage system is configured to perform a first mirroring operation by mirroring the first storage regions to corresponding second storage regions via the first data connection, and to perform a second mirroring operation by mirroring the first storage regions to corresponding third storage regions in the third storage system via the second data connection, and wherein the second storage system is configured:
to detect a failure in the first storage system,
to receive, subsequent to detecting the failure, a request from a host computer to retrieve data from a given second storage region,
to determine that a respective timestamp of the corresponding third storage region on the third storage system is more recent than the respective timestamp of the given second storage region on the second storage system,
to retrieve, via the third data connection, the data from the corresponding third storage region on the third storage system, in response to the received request, and
upon detecting the failure in the first data connection, to perform a reverse resynchronization process by identifying any of the third storage regions whose respective timestamp that is more recent than the respective timestamp of the corresponding second storage region, and copying each given identified third storage region to the corresponding second storage region.

8. The computing facility according to claim 7, wherein each of the mirroring operations is selected from a group consisting of a synchronous mirroring operation and an asynchronous mirroring operation.

9. The computing facility according to claim 7, wherein the second storage system receives the request while performing the reverse resynchronization process.

10. The computing facility according to claim 7, wherein upon completing the reverse resynchronization process, the second storage system is configured to mirror the second storage regions to the corresponding third storage regions in the third storage system via the third data connection.

11. The computing facility according to claim 7, wherein the second storage system is configured to retrieve the data from the corresponding third storage region by redirecting the request to the third storage system.

12. The computing facility according to claim 7, wherein prior to detecting the failure of the first storage system, the second storage system is configured to halt the mirroring of the first storage regions to the second storage regions upon a failure of the first data connection.

13. A computer program product, the computer program product comprising:
- a non-transitory computer readable storage medium having computer readable program code embodied therewith, the computer readable program code comprising:
- computer readable program code arranged to configure a first storage system to perform a first mirroring operation comprising mirroring first storage regions to corresponding second storage regions in a second storage system via a first data connection, and to perform a second mirroring operation comprising mirroring the first storage regions to corresponding third storage regions in a third storage system via a second data connection;
- computer readable program code configured to detect a failure in the first storage system;
- computer readable program code configured to receive, by the second storage system subsequent to detecting the failure, a request from a host computer to retrieve data from a given second storage region;
- computer readable program code configured to determine that a respective timestamp of the corresponding third storage region on the third storage system is more recent than the respective timestamp of the given second storage region on the second storage system;
- computer readable program code configured to retrieve, by the second storage system via a third data connection, the data from the corresponding third storage region on the third storage system, in response to the received request; and
- computer readable program code configured, upon detecting the failure in the first data connection, to perform a reverse resynchronization process comprising identifying any of the third storage regions whose respective timestamp that is more recent than the respective timestamp of the corresponding second storage region, and to copy each given identified third storage region to the corresponding second storage region.

14. The computer program product according to claim 13, wherein each of the mirroring operations is selected from a group consisting of a synchronous mirroring operation and an asynchronous mirroring operation.

15. The computer program product according to claim 13, wherein the computer readable program code receives the request while performing the reverse resynchronization process.

16. The computer program product according to claim 13, wherein upon completing the reverse resynchronization process, the computer readable program code is configured to mirror the second storage regions to the corresponding third storage regions in the third storage system via the third data connection.

17. The computer program product according to claim 13, wherein the computer readable program code is configured to retrieve the data from the corresponding third storage region by redirecting, by the second storage system, the request to the third storage system.

18. The computer program product according to claim 13, and comprising computer readable program code configured prior to detecting the failure of the first storage system, to halt the mirroring of the first storage regions to the second storage regions upon a failure of the first data connection.

* * * * *